W. LUTTRINGHAUS.
MEANS FOR ATTACHING HANDLES AND THE LIKE TO UTENSILS.
APPLICATION FILED JAN. 21, 1918.
1,317,715.
Patented Oct. 7, 1919.
2 SHEETS—SHEET 1
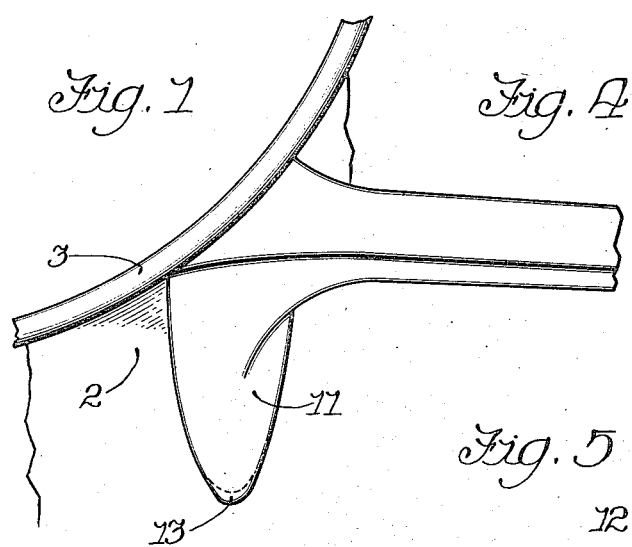
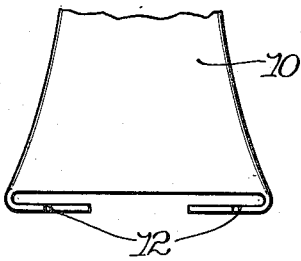
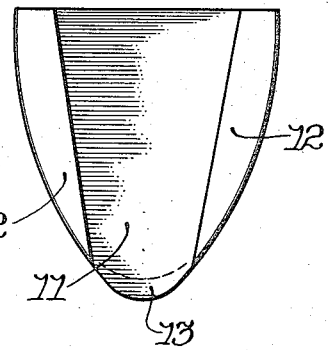
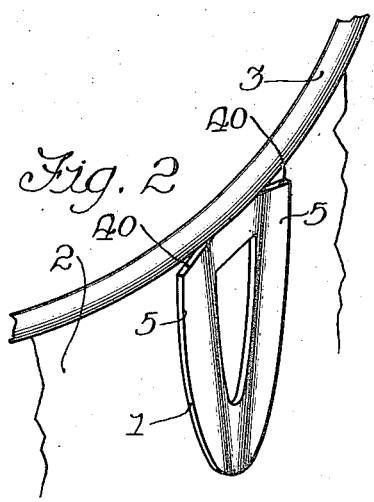
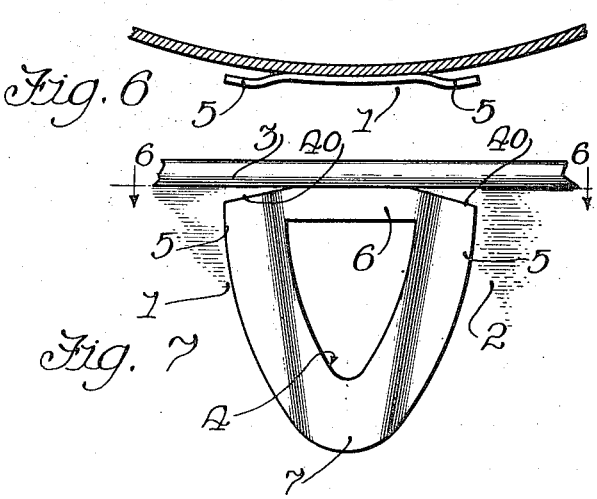
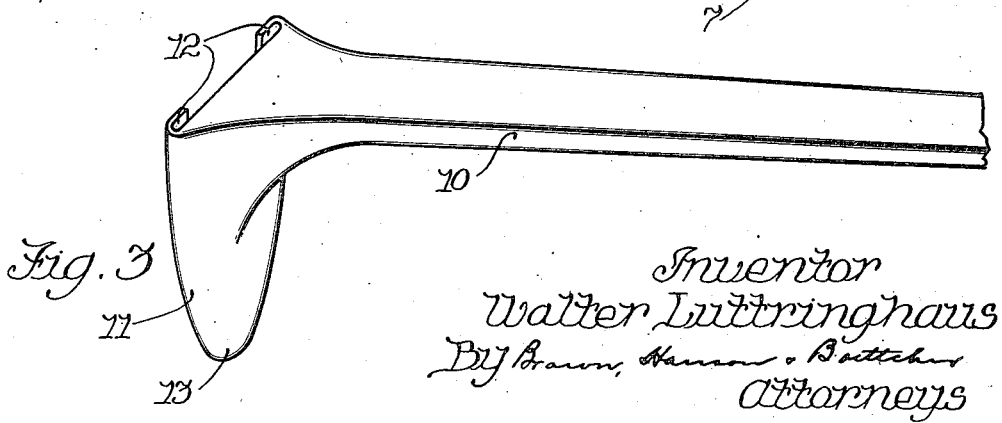
Inventor
Walter Luttringhaus
By Braun, Hanson & Boettcher
Attorneys

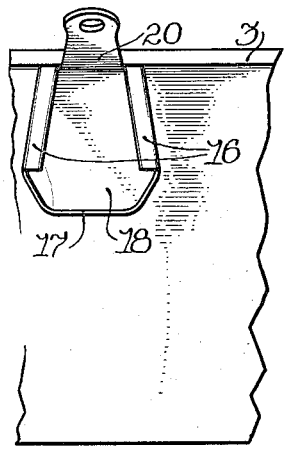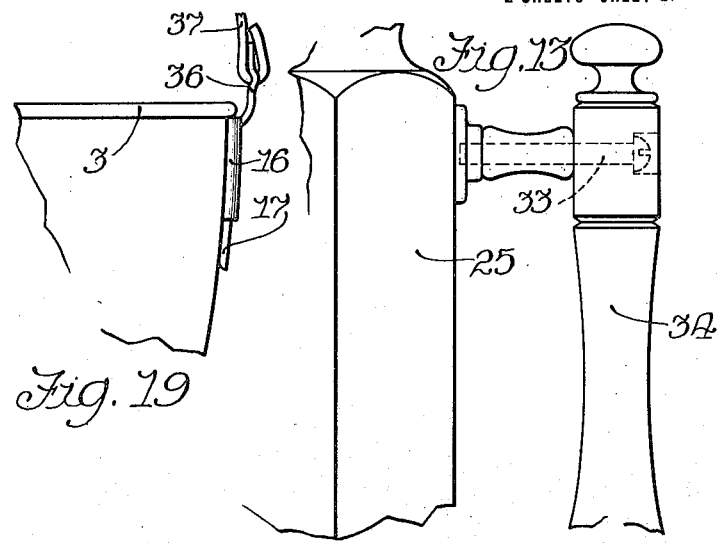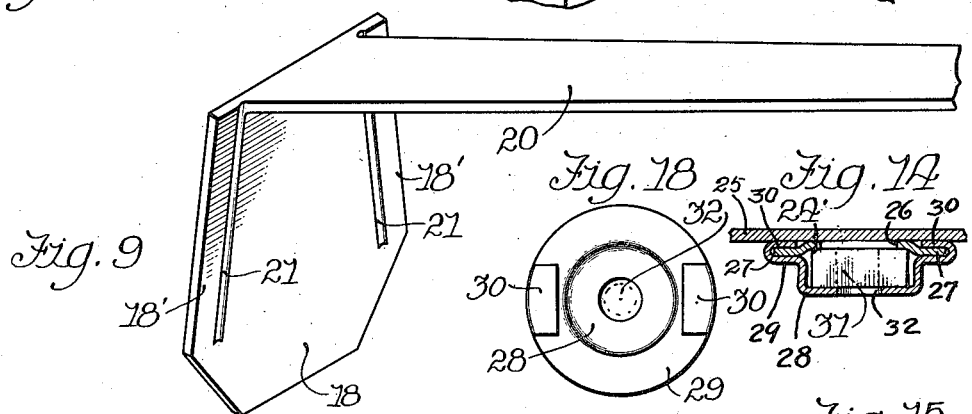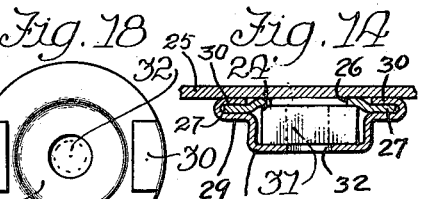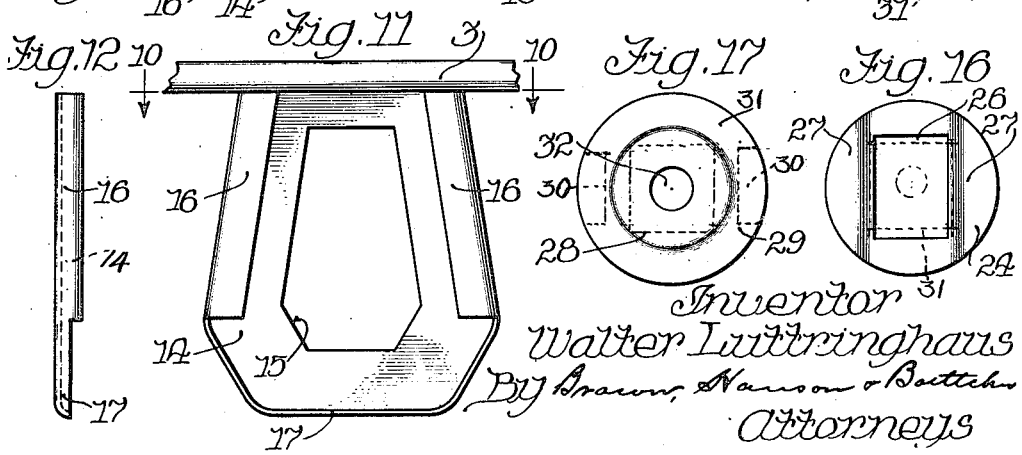

UNITED STATES PATENT OFFICE.

WALTER LUTTRINGHAUS, OF MAYWOOD, ILLINOIS.

MEANS FOR ATTACHING HANDLES AND THE LIKE TO UTENSILS.

1,317,715.  Specification of Letters Patent.  Patented Oct. 7, 1919.

Application filed January 21, 1918. Serial No. 213,081.

*To all whom it may concern:*

Be it known that I, WALTER LUTTRINGHAUS, a citizen of the United States, residing at Maywood, in the county of Cook and State of Illinois, have invented a certain new and useful Improvement in Means for Attaching Handles and the like to Utensils, of which the following is a full, clear, concise, and exact description, reference being had to the accompanying drawings, forming a part of this specification.

My invention relates to improved means for attaching handles and the like to utensils.

My invention is particularly adapted to aluminum utensils, though in its broadest aspect it has a more general utility for attaching other appurtenances such as lugs for bails, cover hinges, supporting legs, etc., to vessels of aluminum or other metals.

Due to the difficulty and expense involved in attaching handles or lugs of aluminum to the body of an aluminum vessel as heretofore practised, iron or sheet metal handles and lugs have generally been employed and have been attached by rivets. This is highly unsatisfactory because of the holes required by the rivets and the inability to make a neat job of the joint.

The rivet or bolt holes have a tendency to enlarge with use of the utensil and as a result the handle soon becomes loose and the utensil leaks through the enlarged rivet holes.

This is due to the comparative softness of the aluminum and it occurs particularly in sheet aluminum utensils where the relatively thin walls of the utensil have insufficient strength to withstand the stresses imposed through the rivets.

By the practice of my invention I am able to securely attach an iron, sheet metal or other handle to an aluminum utensil without riveting or bolting through the utensil and by a method which does not necessitate the cutting of any holes or openings through the body of the utensil.

The practice of my invention broadly involves the fastening of a foundation member or base plate to the outer surface of the vessel or utensil preferably but not necessarily by welding and securing the handle or supporting member to that foundation member by a socket either on the handle or the member and then stamping or pressing the socket and the coöperating part together into permanent engagement. While the foundation plate might be attached in different ways in the preferred form of the invention it is attached by welding.

The foundation for the handle is welded to the utensil but this weld is entirely covered by the handle and therefore no smoothing and polishing of the weld is necessary. This saves an operation which is tedious and expensive. The finished utensil has no projecting parts and presents a neater appearance and smoother contour than do the utensils of the prior art having handles riveted thereto.

Referring to the accompanying drawings wherein I have illustrated several particular embodiments to instruct those skilled in the art—

Figure 1 is a fragmentary perspective view of one form of my improved handle applied to a cooking utensil;

Fig. 2 is a fragmentary perspective view of the utensil with the foundation or escutcheon plate welded thereto;

Fig. 3 is a similar view of the handle in position to be moved up over the foundation escutcheon plate;

Fig. 4 is a fragmentary plan view of the socket end of the handle;

Fig. 5 is an end elevation of the same;

Fig. 6 is a sectional view taken on the line 6—6 of Fig. 7;

Fig. 7 is a front elevational view of the foundation or escutcheon plate in welded position on the utensil;

Fig. 8 is a fragmentary elevational view of a modified form of my improved handle attached to a cooking utensil;

Fig. 9 is a fragmentary perspective view of the handle, shown in Fig. 8 before attaching;

Fig. 10 is a sectional view taken on the line 10—10 of Fig. 11;

Fig. 11 is a front elevational view of the socket plate shown in Fig. 8 in welded position on the utensil;

Fig. 12 is an end elevation of the same;

Fig. 13 is a fragmentary elevational view of a modified form of handle attaching means for percolators, coffee pots and the like employing a bolt and nut connection;

Fig. 14 is an enlarged sectional view of the nut, disk and thimble of the form shown in Fig. 13 in assembled position;

Fig. 15 is a sectional view of the foundation or disk plate used in the form illustrated in Fig. 13, shown in welded position on the utensil;

Fig. 16 is a front elevational view of the foundation or disk shown in Fig. 14;

Fig. 17 is a front elevational view of the thimble shown in Fig. 14;

Fig. 18 is a rear elevational view of said thimble; and

Fig. 19 is a fragmentary side elevation of a bail lug attached to a utensil in the practice of my invention.

In the following specification I shall describe my invention as applied to a culinary utensil such as a sauce pan or rice boiler.

An aluminum plate 1, which forms the foundation for the handle and which is of escutcheon outline, is first welded to the outer wall of the utensil 2 immediately below the beaded rim 3 thereof. I preferably give this plate the escutcheon outline shown to lend symmetry and grace to the utensil, though from the function of this plate it will be apparent that it can be configured in any desired shape to conform to the foot or base of the handle. In the case of sheet aluminum utensils, the plate 1 is of slightly lighter gage aluminum than that used in the utensil. An opening 4, preferably of the same outline, is cut in the center of the plate 1 for saving metal, diminishing the thickness of the resulting handle ear and facilitating the welding operation, as will be presently described. The central portion of the plate is made to conform to the surface of the vessel, as shown in Fig. 6. Marginal wings or flanges 5—5 are formed along the converging sides of the plate 1, and protrude outwardly away from the wall of the utensil 2, as shown in Fig. 6.

In the welding operation this plate is first clamped tight to the wall of the vessel against the beaded rim 3, when the flux and a small quantity of aluminum wire is placed in the opening 4 and the weld is performed around the edges of the opening 4. The cross strip 6 at the top of the plate and the tip 7 at the bottom may also be welded to the utensil, although they need not necessarily be so welded. The plate 1 might be kept imperforate and welded but I find it more expeditious to cut the opening 4 and weld around the edges thereof, the effective strength of the weld being thus distributed over a large area. Moreover in addition to saving metal, the opening 4 affords a pocket for the flow of surplus metal which might otherwise flow from the edges of the plate 1 or under the wings 5—5 and thus require trimming and scraping preparatory to applying the handle 10.

This handle is preferably of hollow sheet metal construction of any preferred general form. An ear 11, of outline to conform to the plate 1, is formed on the base end of the handle 10, the outer face of which ear is provided with a socket formation for engagement with the plate 1. This socket formation comprises the clip members or flanges 12—12 of sheet metal turned in along the converging edges of the ear 11, as shown in Figs. 3, 4 and 5. These clips are shaped to infold the marginal wings 5—5 and to engage in the space between these wings and the wall of the utensil, in other words the wings 5—5 and the clips 12—12 form coöperating or inter-engaging flanges to engage the handle with the vessel.

The application of the handle 10 to the escutcheon plate 1 will be obvious from the foregoing. After sliding the ear 11 and clips 12—12 into embrace with the marginal wings 5—5 of the escutcheon plate 1, so that the upper edge of the ear 11 is in engagement with the beaded rim 3 of the utensil, the utensil is placed in a press and the edges of the ear 11 are subjected to pressure or stamped to press the marginal wings 5—5 and clips 12—12 into inseparable engagement.

The upper edges of the wings 5 are cut away as shown at 40—40 in Fig. 2 to form handle engaging shoulders. When the edges of the socket member are pressed upon the wings 5, the socket member will be pressed close together above the cut away parts 40 of wings 5 and prevent the socket from slipping off.

The pressure or blow is so applied as to roll flat the edges of the ear 11 and thus to place the same flat against the body of the utensil. The lower tip 13 of the ear which projects down below the tip 7 of the escutcheon plate, as shown in dotted lines in Fig. 1, is neatly rounded over this latter tip in the press operation.

When the clips 12—12 and wings 5—5 have been pressed together in this fashion, they are rigidly interlocked and are proof against strains tending to loosen or separate the ear 11 from the plate 1. The greater portion of the strains carried at the handle attachment are borne at the beaded rim 3 at the engagement with the top surface of the handle 10.

In the attaching of flat steel handles, I employ a modified arrangement of attaching parts which does not necessitate the formation of the clips 12—12 along the sides of the handle ear. In the case of a flat steel handle, these clips would be very difficult to shape and more difficult to press into engagement with the marginal wings 5—5 of the escutcheon plate. Accordingly, as is shown in Figs. 8 to 12, I form the clips along the edges of the aluminum plate that is welded to the utensil and press the clips over the margins of the handle ear. This pressing operation is similar to the previous pressing operation described.

In this embodiment the aluminum escutcheon plate is of straight-sided polygonal outline, and is designated 14 see Fig. 11. The plate is provided with an opening 15 and is welded to the utensil around the edges of this opening, identically to the preceding escutcheon plate. The clip members 16—16 converge toward the bead 3 against which the top of the plate 14 abuts. A lip 17 is turned outward at the bottom edge of the plate 14 to engage the lower edge of the ear 18 on the end of the flat steel handle 20. This ear is formed integral with the handle 20. The ear 18 is shaped with the converging sides 18′ which are adapted to be infolded by the clips 16—16 as shown in Fig. 8. Grooves 21—21 extend parallel to the converging sides 18′ and are so spaced therefrom as to receive the edges of the clip members 16—16 which are turned into the grooves in the operation of pressing the clips against the face of the ear 18. The handle portion 20 is made sufficiently narrow to pass between the clip members 16—16 adjacent the bead 3.

The weight of the utensil and its contents is carried by the converging clips 16—16 and the under face of the beaded rim 3. The edges of the clips 16—16 engaging in the grooves 21—21 and the lip 17 engaging with the bottom edge of the ear 18 prevent the handle from disengaging through the bottom of the socket plate 14.

In Fig. 19 the ear 18 is shown as provided with a lug 36 for attachment of a bail 37. The ear is mounted and stamped in the socket plate 14 in the same manner as above described.

In the attachment of ornamental handles to percolators, coffee pots and the like, a common expedient is to secure a small threaded nut to the wall of the utensil as by supporting it in a thimble which is riveted to the percolator, and thereafter attaching the handle to the utensil by passing a screw bolt therethrough and threading it into the nut. This construction is advantageous and desirable for attaching ornamental handles to aluminum utensils but here again there is an inherent weakness in the riveted connection between the thimble and utensil.

In Fig. 13 I have illustrated a percolator handle wherein the rivets have been dispensed with pursuant to the practice of my invention.

The base plate, in this instance a disk 24 (Fig. 16) is first welded to one face of the polygonal vessel 25 around the edges of the opening 26 in said disk. This disk has upstanding wings 27—27 between which the nut 31 is received.

The socket member in this form is a thimble 28 comprising the flange 29 and peripheral clips 30—30 and is adapted to engage with the disk 24 to support the nut 31 therebetween. The clips 30—30 are adapted to engage under the wings 27—27, as shown in Fig. 14, and to be pressed into rigid engagement with the disk 24, similarly to the clips 12 and escutcheon plate 1 of Figs. 2 and 3. The flange 29 of the thimble is preferably of slightly larger diameter than that of the disk 24 so that the periphery of the flange may be rounded over the periphery of the disk to conceal the latter. A bolt hole 32 is provided in the center of the thimble 28 through which passes the screw bolt 33 of the handle 34. The nut 31 by its engagement between the raised wings 27, is prevented from turning with the bolt 33.

In this form of the invention, the nut may be held by the wings 27 and the overhanging edges of the disk 29 prevent disengagement of the disk and the foundation plate.

The invention is obviously not limited to use in connection with aluminum utensils, but it is particularly useful in that connection.

It should be noted that in each form of my invention the weld is entirely covered by the handle and thus no finishing nor polishing of the weld is required.

I do not intend to be limited to the particular shapes and arrangements of parts herein shown and described.

I claim:

1. In combination, an aluminum vessel having a bead, a base plate having an opening in the body thereof, said plate being mounted below the bead, the edge of said opening being molecularly joined to the vessel, said base plate being adapted to be engaged by a supporting member, and a supporting member adapted to cover the opening in the base plate and rest against the lower side of the bead, said supporting member having edges, the edges of said base plate and said supporting member being over-lapped and pressed into binding engagement.

2. In combination, a vessel having a thin metallic wall, a base plate having an opening in the body thereof, the edges of the opening being joined by molecular union to the surface of the vessel, and a supporting member of metal lying over said opening and covering the joint between the base plate and the wall of the vessel, said supporting member and said base plate having overlapping edges which are pressed into binding engagement and into close proximity to the walls of the vessel.

3. In combination, an aluminum vessel, an aluminum plate member having edges at the central portion which are molecularly joined to the body of the vessel, said plate member having free edges, a supporting member having free edges, said supporting member being adapted to be attached to said plate member, one of said members having its edges folded over the edges of the other member, the plate member and the supporting member being pressed into intimate engagement against the side of the vessel.

4. In combination, a vessel, a plate secured by molecular union solely at its central portion to the vessel, a handle member for the vessel, said handle member having a socket adapted to inclose said plate, said socket and said plate being pressed together against the side of the vessel into binding engagement.

5. In combination, a vessel, a handle member for the vessel, a plate for connecting the handle to the vessel, said plate being joined at its central portion by molecular union to the wall of the vessel, said handle member and the plate having their peripheral edges overlapped to hold them firmly together, said plate being secured to the vessel solely at points lying under and within the periphery of the handle member.

6. In combination, a vessel, a handle member for the vessel and a base plate for connecting the handle to the vessel, said handle member and the plate having their outer edges interlocked to hold them firmly together, said plate being cut away within its outer edges, the edges of said cut away portion being joined by molecular union to the body of the vessel.

In witness whereof I hereunto subscribe my name this 17th day of January, A. D. 1918.

WALTER LUTTRINGHAUS.